(12) United States Patent
Donlagic

(10) Patent No.: US 6,711,330 B1
(45) Date of Patent: Mar. 23, 2004

(54) OPTICAL TRANSMISSION LINK WITH LOW BENDING LOSS

(75) Inventor: Denis Donlagic, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/012,970

(22) Filed: Dec. 7, 2001

(51) Int. Cl.$^7$ ............................... G02B 6/26; G02B 6/18
(52) U.S. Cl. .................... 385/123; 385/50; 385/124
(58) Field of Search ........................ 385/31, 32, 50, 385/123–126

(56) References Cited

U.S. PATENT DOCUMENTS

| | | | | |
|---|---|---|---|---|
| 4,260,221 A | * | 4/1981 | Marcuse | 385/124 |
| 4,641,914 A | | 2/1987 | Sheem | 350/96.15 |
| 5,175,785 A | * | 12/1992 | Dabby | 385/123 |
| 5,381,504 A | * | 1/1995 | Novack et al. | 385/128 |
| 5,644,670 A | * | 7/1997 | Fukuda et al. | 385/124 |
| 5,732,170 A | * | 3/1998 | Okude et al. | 385/27 |
| 6,185,346 B1 | * | 2/2001 | Asawa et al. | 385/28 |
| 6,498,652 B1 | * | 12/2002 | Varshneya et al. | 356/477 |

OTHER PUBLICATIONS

Donlagic et al., "Low–loss Transmission through Tightly Bent Standard Telecommunication Fibers", Applied Physics Letters, vol. 77, No. 24, Dec. 11, 2000.

* cited by examiner

Primary Examiner—Hemang Sanghavi
Assistant Examiner—Omar Rojas
(74) Attorney, Agent, or Firm—Randall S. Wayland

(57) ABSTRACT

An optical signal transmission link includes a first single mode optical fiber for receiving an optical signal, and a graded index multimode optical fiber for receiving the optical signal from the first single mode optical fiber. The multimode fiber of the transmission link is adapted to support the propagation of greater than or equal to 4 LP modes within the wavelength range of from about 1310 nm to about 1550 nm, has a mode field diameter of the fundamental mode of within the range of from about 3.0 $\mu$m to about 14.0 $\mu$m within the wavelength range of from about 1300 nm to about 1650 nm, and has a numerical aperture (NA) value of greater than or equal to about 0.16.

42 Claims, 5 Drawing Sheets

OPTICAL TRANSMISSION LINK WITH LOW BENDING LOSS

BACKGROUND OF THE INVENTION

1. Field of the Invention

The present invention relates to an optical signal transmission link, and more particular to an optical signal transmission link that exhibits a resistance to bending losses, while maintaining a large mode field diameter.

2. Technical Background

The attenuation of a light signal within an optical waveguide fiber caused by bending losses, such as macrobend loss and microbend loss, is an important consideration in the design of optical transmission systems and components, such as amplifiers, fiber optic devices, fiber optic sensors and integrated optics. While attempts have been made to design these optical transmission systems and components around bending losses, sharp bending of the associated optical fiber is inherent in some optical systems, such as amplifiers, miniature delay lines, pay-out systems, fly-by light systems, Sagnac interferometers, and other similar systems, components and environments.

Heretofore, the problems associated with bending losses in the above listed components and like systems were solved by utilizing high numerical aperture, reduced core, single mode fibers. However, these high numerical aperture single mode fibers have several drawbacks including a limited bending loss performance, significant wavelength dependency, and relatively small mode field diameters, which are incompatible with standard single mode telecommunication systems.

Therefore, it would be desirable to develop alternative optical transmission systems and associated optical transmission links that provide a high bending tolerance while maintaining relatively large mode field diameters.

SUMMARY OF THE INVENTION

The present invention meets the need for an optical transmission link that provides a high tolerance to both microbending and macrobending attenuation losses, while maintaining a relatively large mode field diameter.

One embodiment of the present invention is to provide an optical signal transmission link that includes a first single mode optical fiber for receiving an optical signal, and a graded index multimode optical fiber for receiving the optical signal from the first signal mode optical fiber. The multimode optical fiber of the transmission link is adapted to support the propagation of greater than or equal to four LP modes within a wavelength range of from about 1310 nm to about 1550 nm, has a mode field diameter of within the range of from about 3.0 μm to about 14.0 μm within a wavelength range of from about 1300 nm to about 1650 nm, and has a numerical aperture value of greater than or equal to about 0.16.

Another embodiment of the present invention relates to an optical signal transmission link that includes a first single mode optical fiber for receiving an optical signal, and a graded index multimode optical fiber for receiving the optical signal from the first single mode optical fiber. The multimode optical fiber of the transmission link is adapted to support the propagation of greater than or equal to 4 LP modes within a wavelength range of from about 1310 nm to about 1550 nm. The transmission link provides a bending loss of less than or equal to about 0.60 dB within a wavelength range of from about 1300 nm to about 1630 nm when 1000 loops of the multimode fiber is wrapped about a cylinder having a 2.0 mm diameter.

The present invention also includes optical communication systems employing optical signal transmission links in accordance with the embodiments described above.

The present invention utilizes a first single mode optical fiber in combination with a graded index multimode optical fiber to provide an optical signal transmission link that is highly resistant to microbend and macrobend attenuation losses, while simultaneously providing a large mode field diameter.

Additional features and advantages of the present invention will be set forth in the detailed description which follows and will be apparent to those skilled in the art from the description or recognized by practicing the invention as described in the description which follows, together with the claims and appended drawings.

It is to be understood that the foregoing description is exemplary of the invention only and is intended to provide an overview for understanding of the nature and character of the invention as it is defined by the claims. The accompanying drawings illustrate various features and embodiments of the invention, which, together with their description serve to explain the principals and operations of the invention.

DETAILED DESCRIPTION OF THE PREFERRED EMBODIMENT

For purposes of the description herein, it is to be understood that the invention may assume various alternative orientations and step sequences, except where expressly specified to the contrary. It is also to be understood that the specified devices and process illustrated in the attached drawings and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Definitions

Alpha profile—The refractive index of an alpha profile is defined as:

$$n=n_0(1-\Delta(r/a)^\alpha)$$

where n is the refractive index at a particular radii, $n_0$ is the maximum value of the refractive index of the core (generally at the core center), r is the fiber radius, a is the outer radius of the core, α is a an exponent referred to as the alpha profile parameter, and Δ is defined as:

$$\Delta=[(n_1^2-n_c^2)/2n_1^2]$$

where $n_1$ is the maximum core refractive index (generally at the fiber center), and $n_c$ is the refractive index of the cladding.

Single mode optical fiber—Fiber that supports propagation of only one mode.

Multimode optical fiber—Fiber that supports propagation of more than one mode (typically four to several hundred modes).

Graded index multimode optical fiber—Fiber that supports propagation of more than one mode and has a refractive index of the fiber profile that changes gradually from fiber core center to fiber core edge. Examples include 1) a parabolic refractive index profile where the index changes proportional to the square of the radius being maximum in the center and minimum at the core edge, 2) a triangular profile where the refractive index decreases linearly proportional to the fiber radius being maximum in the center and minimum at the core edge, and 3) an alpha refractive index profile, where a is typically less than 5.

Numerical aperture (NA)—For an optical fiber, the numerical aperture is given by:

$$NA=[(n_1^2-n_c^2)]^{1/2}$$

LP Mode—Linearly polarized modes are a solution of the wave equation.

Figure 1:
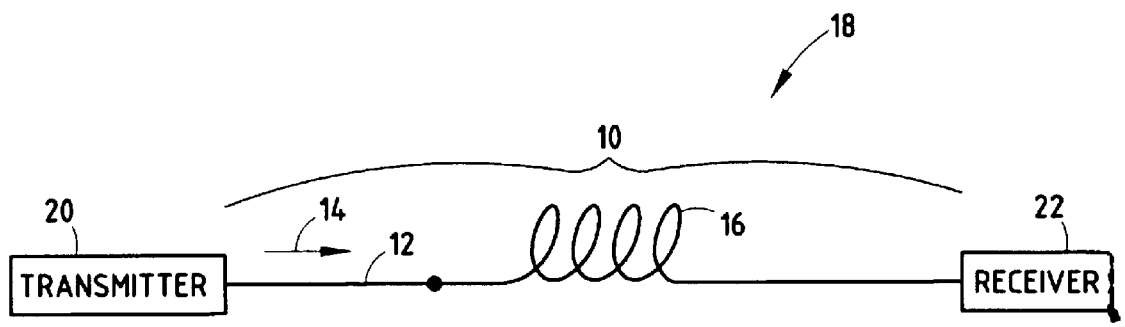
FIG. 1 is a schematic view of a fiber optic communication system employing an optical transmission link embodying the present invention and including a single mode optical waveguide fiber, and a graded index multimode optical fiber.

A general representation of the optical signal transmission link 10 embodying the present invention is illustrated in FIG. 1. Transmission link 10 includes a first single mode optical fiber 12 for receiving an optical signal represented by and traveling in a direction indicated by an arrow 14, and a graded index multimode optical fiber 16 coupled to single mode fiber 12, for receiving optical signal 14 therefrom, and receiving a bending strain. Transmission link 10 provides high tolerance to bending loss, while simultaneously maintaining a relatively large mode field diameter.

The single mode optical fiber 12 is typically approximately one meter in length, and provides selective excitation of a fundamental, or nearly fundamental, mode of propagation of single 14 within a wavelength range of from about 1310 nm to about 1550 nm. The multimode optical fiber 16 preferably supports the propagation of at least 4 LP modes within a wavelength range of from about 1310 nm to about 1550 nm, and more preferably of greater than 4 LP modes within the same wavelength range. Multimode fiber 16 is provided a mode field diameter of the fundamental mode of preferably within the range of from about 3.0 μm to about 14.0 μm within a wavelength range of from about 1300 nm to about 1650 nm, more preferably of 7.0 μm at a wavelength of about 1310 nm, and most preferably of about 9.3 μm at a wavelength of about 1310 nm. Multimode fiber 16 is also provided with a numerical aperture value of preferably greater than or equal to about 0.16, and more preferably of greater than or equal to about 0.20. Multimode fiber 16 is further provided with an alpha profile having an alpha value of preferably within the range of from about 0.5 to about 5.0, more preferably of within the range of from about 1.0 to about 3.0, and most preferably of within range of from about 1.5 to about 2.5. The maximum refractive index difference of multimode fiber 16 is preferably greater than or equal to about 0.8%, more preferably greater than or equal to about 1.0%, and most preferably greater than or equal to 3.0%. In a preferred embodiment, multimode fiber 16 is provided an alpha profile that includes a parabolic index, a core diameter of within the range of from about 10 μm to about 70 μm, more preferably of within the range of from about 15 μm to about 50 μm and most preferably of within the range of from about 20 μm to about 40 μm, and a numerical aperture value of greater than or equal to 0.275.

The above optical parameters and physical characteristics of transmission link 10 provide an optical fiber communication line having a bending loss of preferably less than or equal to about 0.60 dB within a wavelength range of from about 1300 nm to about 1630 nm when 1000 loops of multimode fiber 16 is wrapped about a cylinder having a 2.0 mm diameter, a more preferred bending loss of less than or equal to 0.50 decibels within a wavelength range of from about 1300 nm to about 1630 nm when 1000 loops of multimode fiber 16 is wrapped about a cylinder having a 5.0 mm diameter, and most preferably of less than or equal 0.50 decibels within a wavelength range of about 1300 nm to about 1630 nm when 1000 loops of multimode fiber 16 is wrapped about a cylinder having an 8.0 mm diameter. The derivation and calculations of the above referenced optical and physical parameters of single mode fiber 12 and multimode fiber 16 are described below.

The difference in bending loss between single mode fiber 12 if single mode fiber 12 comprised the entire transmission link 10, as compared to the single mode launched multimode optical fiber 16 can be explained by assuming a curved multimode fiber 16 with a curvature radius R, cladding level $n_1$, a maximum core index $n_2$, and that the local phase velocity of the mode in a curved fiber is proportional to the distance r measured from the center of the fiber curvature. The effective refractive index of the fundamental mode is inversely proportional to r, and is approximated as, $$n_{\mathit{eff}}(r) = n_{\mathit{eff}}(R)\frac{R}{r},$$

where, $n_{\mathit{eff}}(R)$ is the effective refractive index of the mode at the fiber axis. The phase velocity reaches the limiting velocity of the light in the medium at a certain distance $r_d$ beyond which the fraction of the mode field is no longer guided and radiates away from the fiber. The position of the dissociation point $r_d$ in the cladding depends on the absolute value of the effective refractive index in the straight fiber when approximating the effective refractive index of the fundamental mode at the fiber axis $n_{eff}(R)$ by the effective refractive index of the mode in straight fiber. The dissociation point $r_d$ occurs when $n_1$ equals $n_{eff}(r_d)$ and is approximated as, $$r_d = R \frac{n_{eff}(R)}{n_1}.$$

The dissociation point $r_d$ shifts deeper into the cladding and the fraction of the field effected by the curvature reduces with an increase in $n_{eff}(R)$, thereby resulting in lower macrobend sensitivity of the fiber. The effective refractive index $n_{eff}(R)$ of the fundamental mode within multimode fiber 16, which as noted above supports at least four LP modes, is near the maximum refractive index of the fiber core, thereby resulting in a significantly larger $n_{eff}(R)/n_1$ ratio as in the case of a single mode fiber, resulting in a considerably lower macrobend sensitivity of the fundamental mode in multimode fiber 16.

The bending loss of optical power in a bend of constant curvature R within multimode fiber 16 is approximated as, $$\frac{P_1}{P_0} = e^{-\alpha_b(R_o)l},$$

where $P_0$ is the optical power at the beginning of the curvature, $P_1$ is the optical power at the end of the curvature, l is the length of the curvature, and $\alpha_b$ is the bend loss coefficient. As the bending loss within curved multimode fiber 16 depends on the fraction of the field effected by the curvature, the bending loss within multimode fiber 16 is approximated by, $$\alpha_b(R_0) = \frac{\lambda}{(2w)^2 n} \cdot \frac{P_{radiative}(R_0)}{P_{total}(R_0)},$$

where $\lambda$ is the wavelength of signal propagation, $P_{radiative}$ is the portion of the field effected by the curvature, i.e., the field beyond the dissociation point, $P_{total}$ is the total optical power flowing through multimode fiber 16, and w is the mode field diameter of multimode fiber 16. It is known that the bending loss coefficient as defined above can be closely approximated from Maxwell equations if $R_0$ is increased by a factor of 1/0.6. Considering this relationship and photoelastic effects, wherein the photoelasticity increases the effective curvature radius by between 20 and 30%, a realistic loss coefficient is approximated by, $$R_{fiber} = c \cdot R_0,$$

where $R_{fiber}$ is the real or physical radius of curvature, and c is defined as 1/0.6·1.2, or 1.39. The loss coefficient is approximated by, $$\alpha_b(R_0) = \frac{\lambda \int_x^\infty \int_{-ArcCos(\frac{x_c}{r})}^{ArcCos(\frac{x_c}{r})} E^2(\rho, \phi) d\rho d\phi}{(2w)^2 n \int_0^\infty \int_0^{2\pi} E^2(\rho, \phi) d\rho d\phi},$$

where E is the traversal component of the field in a straight fiber, and $\rho$ and $\phi$ are cylindrical coordinates, and $x_c$ is the dissociation point measured from the fiber center and is defined as, $$x_c = \left(\frac{n_{eff}(R)}{n_1} - 1\right) R.$$

In the illustrated example, single mode fiber 12 is utilized as the launching system for optical signal 14 to ensure excitation of only the fundamental mode within multimode fiber 16. The single mode fiber 12 thereby eliminates possible noise that would result from inter-module interference within multimode fiber 16. Multimode fiber 16 includes a graded index core, that confines the fundamental mode to a different region of the core from the higher order modes, thereby providing a significant advantage over step index fibers. Multimode fiber 16 is preferably provided with a large refractive index gradient, such as those found in parabolic fibers, wherein the fundamental mode remains confined to a narrow region of the core near the fiber axis while simultaneously increasing the mode field diameters of the high order spatial modes. The principal mode groups in graded multimode fiber 16 includes sufficiently different mode field diameters that allow for relatively selective mode launching, and compensate for mismatch and imperfect launching conditions.

The multimode optical fiber 16 is adjusted to match the mode field diameter of the multimode fiber 16 with the single mode fiber 12. Specifically, the core diameter of multimode fiber 16 is adjusted while maintaining a high $n_{eff}/n_2$ ratio. The relationship of the mold field diameter in an alpha-profile fiber such as multimode fiber 16, is defined as, $$w = a\left[\frac{A}{V^{2/(a+2)}} + \frac{B}{V^{3/2}} + \frac{C}{V^6}\right],$$

wherein $A = ((2/5)[1+4(2/\alpha)^{5/6}])^{1/2}$, $B = \exp(0.298/\alpha) - 1 + 1.478(1 - \exp(-0.077\alpha))$, $C = 3.76 + \exp(4.19/\alpha^{0.418})$, V is the normalized frequency of the fiber, and A is the core radius. As an example, the core diameter of multimode fiber 16 for an alpha value of 2 is represented by $2a = 28.2 \mu m$.

The microbend loss in the single mode launched multimode fiber 16 is caused primarily by the coupling between the fundamental and first higher order mode. The coupled power coefficient between two modes in multimode fiber 16 submitted to a microbend deformation is defined by, $$h = K\frac{C(\Delta \beta)}{\Delta \beta^4},$$

where $\Delta \beta$ is the difference in the propagation constant of the coupled modes, and K is proportional to the overlap integral of the modes. The $C(\Delta \beta)$ is the power spectrum of the curvature, and is defined as, $$C(\Delta \beta) = \left\langle \left| \frac{1}{L} \int_0^L \frac{1}{R(z)} e^{i\Delta \beta z} dz \right|^2 \right\rangle,$$

where R(z) describes the curvature function of a perturbed fiber. As is known in the art, the curvature power spectrum can be approximated by, $$C(\Delta \beta) = \frac{C_0}{\Delta \beta^{2p}},$$

where $C_0$ is constant and p=1,2. The microbend loss of the single mode launched multimode fiber 16 depends primarily on the $\Delta\beta$ between the fundamental and first higher order modes. The coupled power coefficient increases proportionally to about $1/\Delta\beta^6$, thereby indicating that an increase in $\Delta\beta$ of about 50% increases the coupling coefficient more than an order of magnitude. The $\Delta\beta$ between the fundamental and first higher order modes must be as large as possible in order to assure low microbend sensitivity of the system. This is determined by defining the difference in the propagation constant of the coupled modes as, $$\Delta\beta = \sqrt{\frac{\alpha}{\alpha+2}} \frac{2\sqrt{\Delta}}{a} \left(\frac{m}{M}\right)^{[(\alpha-2)/(\alpha+2)]},$$

where m is the modal group label, e.g., m=1 for $\Delta\beta$ between the first and second mode, $\alpha$ is the core radius, and M is the number of modal groups expressed as, $$M = \frac{\alpha}{\alpha+2} a^2 k^2 \Delta.$$

EXAMPLES

The optical and physical parameters of the following examples were calculated utilizing design software FIBER CAD 1.0, commercially available from Optiwave, Inc. of Ottawa, Ontario, Canada.

Figure 2:
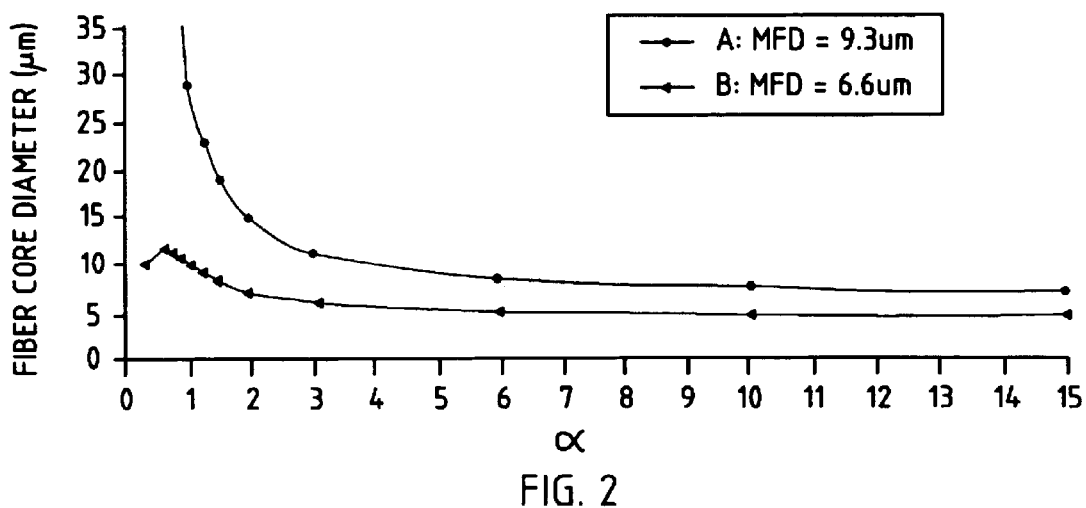
FIG. 2 is a diagram of fiber core diameter versus alpha for a targeted mode field diameter of a fundamental mode signal propagation within the multimode optical fiber.

Modeled Example A includes a multimode fiber compatible with standard single mode systems and a common numerical aperture. The multimode fiber of Example A includes an alpha-profile, having a numerical aperture value of 0.275 and a targeted fundamental mode field diameter of 2w=9.3 $\mu$m at a wavelength of 1310 nm. Modeled Example B includes a multimode fiber having a reduced mode field diameter compatible with a high numerical aperture, bend resistive single mode system. The multimode fiber utilized in Example B includes an alpha-profile, a numerical aperture value of 0.275, and a targeted fundamental mode field diameter of 2w=6.6 $\mu$m at a wavelength of 1310 nm. In both examples, the core diameter of the associated multimode fiber is varied until the desired mode field diameter is obtained. FIG. 2 charts the fiber core diameter vs. alpha for the targeted mode field diameter of the multimode fiber. As is illustrated in FIG. 2, the core size increases rapidly for an alpha value of less than 1 for the multimode fiber of Example A.

Figure 3:
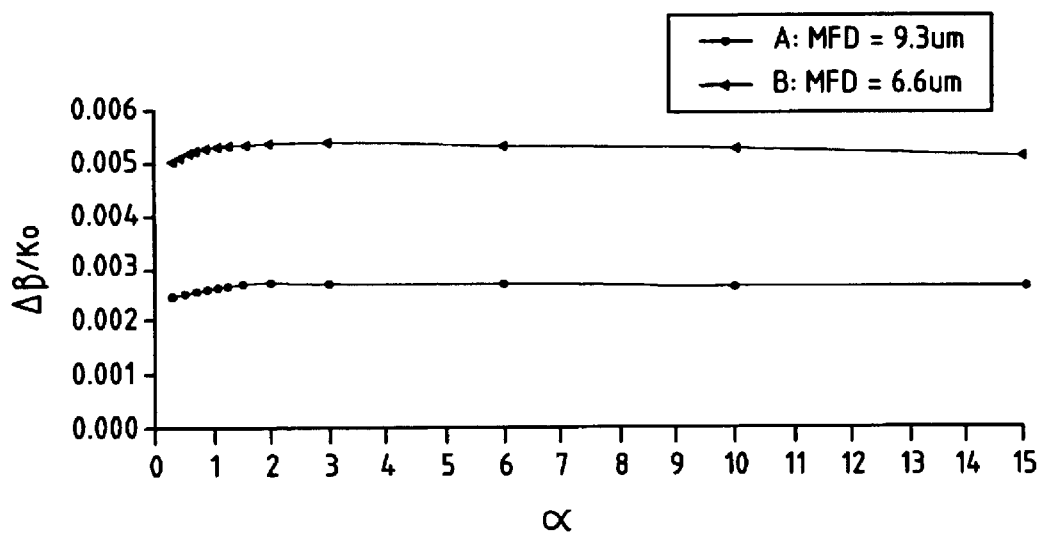
FIG. 3 is a diagram of $\Delta\beta$ normalized by $K_0$ versus alpha for a targeted mode field diameter for the multimode optical fiber.
Figure 4:
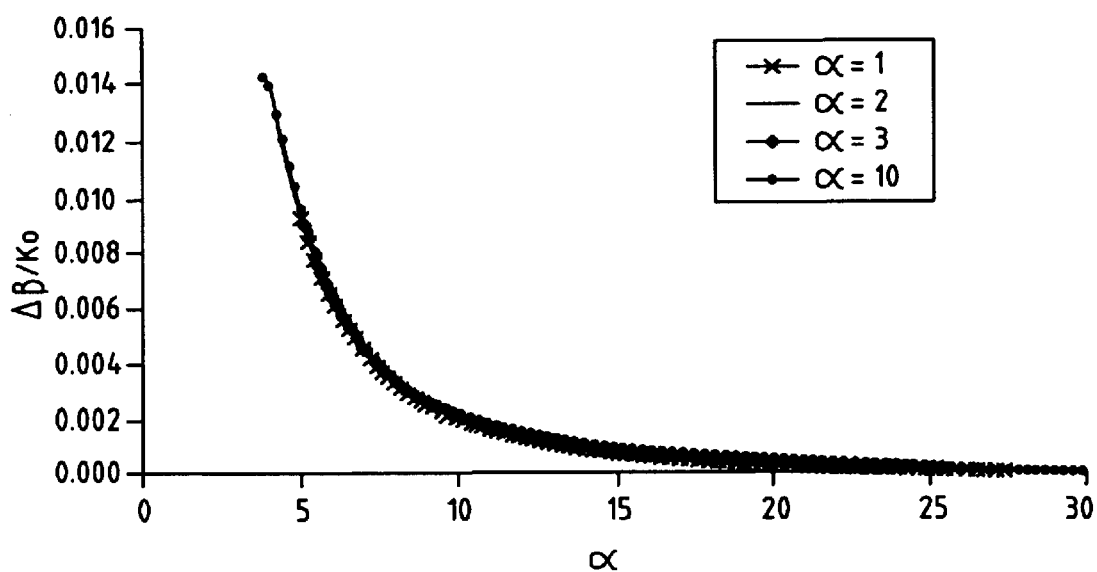
FIG. 4 is a diagram of $\Delta\beta$ normalized by $K_0$ versus mode field diameter for various alpha values for the multimode optical fiber.
Figure 5:
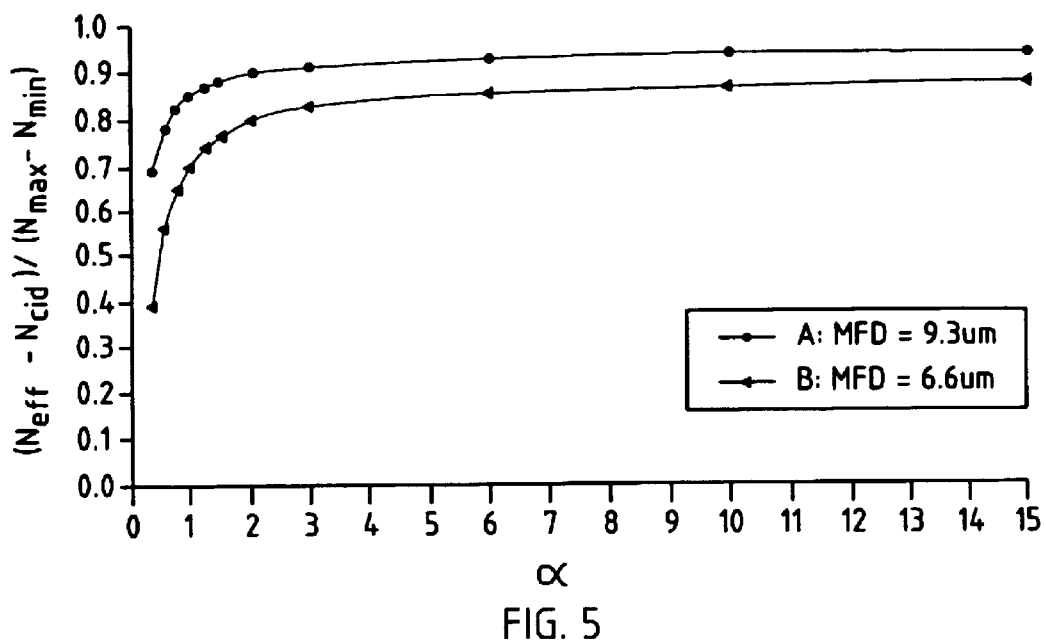
FIG. 5 is a diagram of macrobend efficiency versus alpha for target values of mode field diameters for the multimode optical fiber.

FIG. 3 illustrates the $\Delta\beta$ between the fundamental mode and the next higher order mode in $\beta$ space. It should be noted that $\Delta\beta$ is highly dependent on the mode field diameter of the multimode fiber with very little dependence on alpha for alpha values of greater then 0.5. Along the same lines, FIG. 4 illustrates $\Delta\beta$ vs. mode field diameter for fibers with varying alpha values. FIG. 4 indicates that $\Delta\beta$ depends almost completely on the mode field diameter and wavelength and is nearly independent of the alpha value. The ratio of $(n_{eff}-n_1)/(n_2-n_1)$, as shown in FIG. 4, is the fiber "macrobend efficiency," i.e., the ability of the multimode fiber to take advantage of the available index difference to achieve a high $n_{eff}$. A fiber with a ratio of 1 has the maximum possible macrobend resistance for any given numerical aperture value, while a fiber with a ratio close to 0 is highly sensitive to macrobends. As shown in FIG. 5, fiber macrobend efficiency drops rapidly at low values of alpha, however, changes very little for alpha values above 2.

Figure 6:
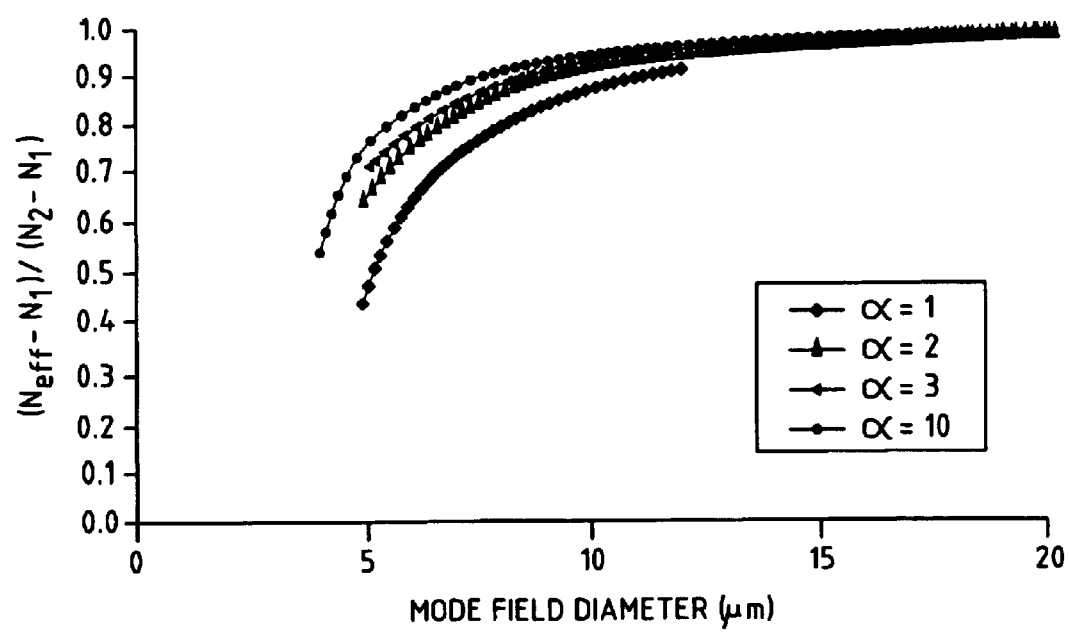
FIG. 6 is a diagram of macrobend efficiency versus mode field diameter for target values of alpha for the multimode optical fiber.

FIG. 6 illustrates the ratio of $(n_{eff}-n_1)/(n_2-n_1)$ vs. the mode field diameter for fibers with different values of alpha as compared to those illustrated in FIG. 4. The fibers of FIG. 6 were provided a numerical aperture value of 0.275 at a wavelength of 1310 nm. As indicated in FIG. 6, small mode field diameters correspond with significant reduction in microbend efficiency in the multimode fibers.

Figure 7:
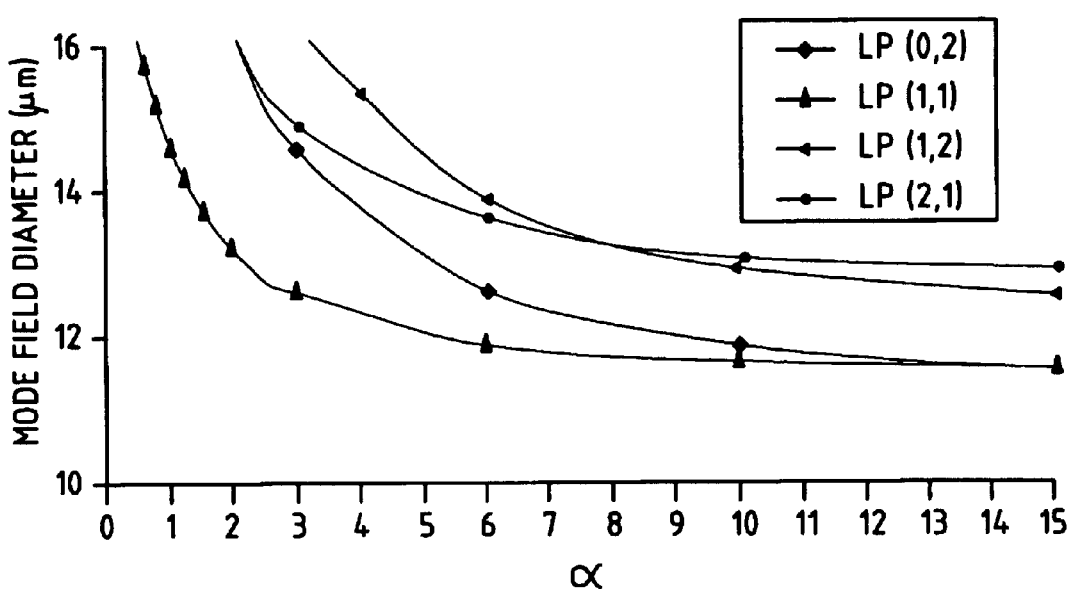
FIG. 7 is a diagram of mode field diameter versus alpha for a plurality of first higher order modes for a first experimental fiber.
Figure 8:
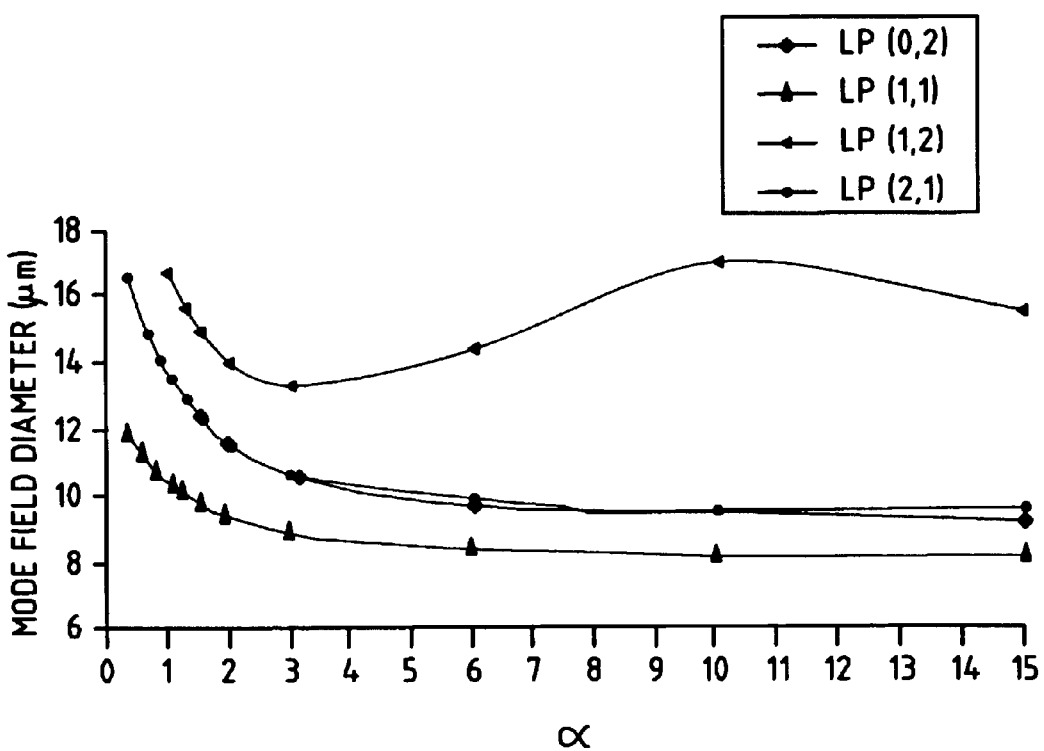
FIG. 8 is a diagram of mode field diameter versus alpha for a plurality of first higher order modes for a second experimental fiber.

FIGS. 7 and 8 illustrate the mode field diameters of the four closest spatial neighbors of the fundamental mode vs. a parameter alpha for design examples A and B. The difference in the mode field diameter between the fundamental mode and the higher order modes decrease with alpha, thereby indicating that utilizing a multimode fiber with a low alpha is advantageous to fibers with a high alpha. In order to allow simple and effective fundamental mode launch it is desirable to choose fibers having low alpha values. However, reduction of the alpha value also reduces macrobend resistance, i.e., the ratio $(n_{eff}-n_1)/(n_2-n_1)$, with this effect becoming increasingly important for mode field diameter below 6 $\mu$m at wavelengths of about 1310 nm, or for fibers wherein alpha is less than 1.

The $\Delta\beta$ between the fundamental mode and the first higher order mode depends nearly solely on the mode field diameter for fiber with an alpha value of greater than 1. The microbend sensitivity of the fiber, therefore, predominantly depends on the mode field diameter of the fiber due to the highly non-linear relationship between $\Delta\beta$ and the coupling coefficient. The influence of the fiber profile is reflected only through the overlap integral between the fundamental mode and the higher order modes. As a result, fibers with the same mode field diameter and different alpha values experience different macrobend sensitivity, and fibers with lower alpha values are less sensitive to microbend loss than fibers with higher alpha values.

Table 1 lists the physical parameters for a pair of fibers Examples 1 and 2, as constructed and tested.

TABLE 1

Physical Parameters of Example Fibers 1 and 2

|  | Example 1 | Example 2 |
| --- | --- | --- |
| Core size ($\mu$m) | 28.6 | 37.6 |
| NA | 0.27 | 0.27 |
| Outer diameter | 80 | 125 |
| $\alpha$ | 2 | 2 |
| Mode field diameter ($\mu$m) at 1310 | 9.1 | 10.4 |

The macrobend test results for Examples 1 and 2 are summarized in Table 2, wherein d is the diameter of the cylinder about which the multimode fibers where spooled.

TABLE 2

Bend Loss For Example Fibers 1 and 2

| | Example 1 | | Example 2 | |
| --- | --- | --- | --- | --- |
| | d(mm) | Bend Loss (dB) | d(mm) | Bend Loss (dB) |
| 10 loops | 1.3 | <0.02 | 2.1 | <0.02 |
| 100 loops | 1.6 | <0.15 | 2.6 | <0.05 |
| 1000 loops | 1.6 | <0.63 | 3.1 | <0.064 |

Figure 9:
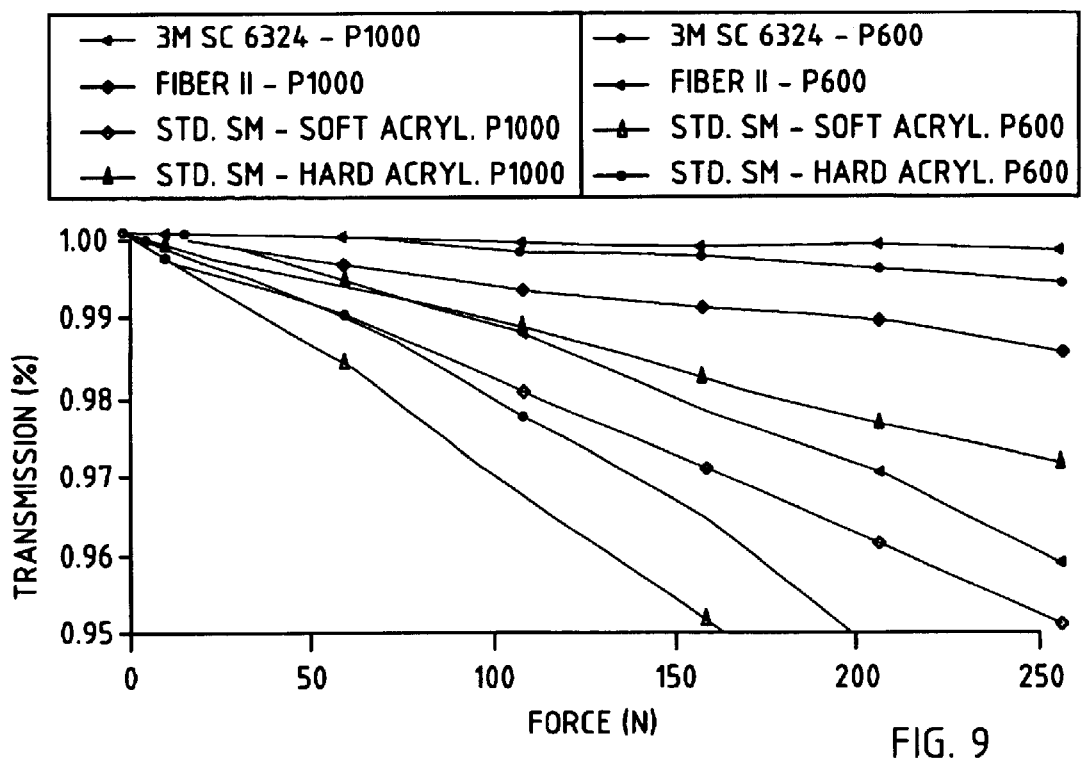
FIG. 9 is a diagram of transmission percentage versus force indicating microbend sensitivity for a plurality of multimode optical waveguide fibers each having a 125 μm diameter.
Figure 10:
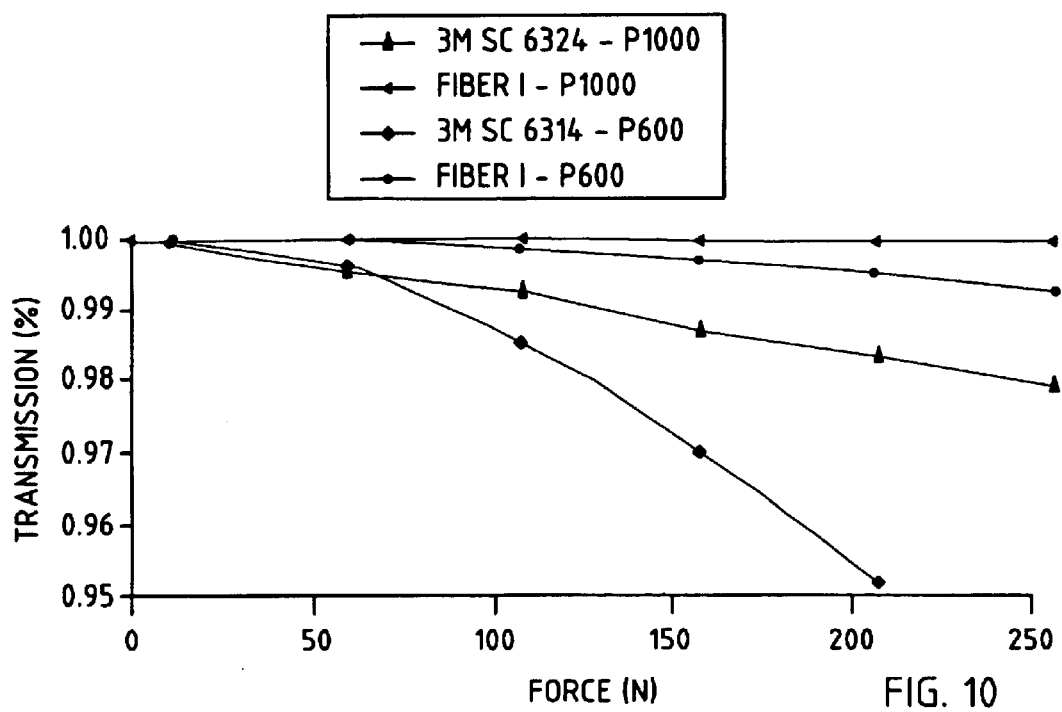
FIG. 10 is a diagram of transmission percentage versus force indicating microbend sensitivity for a plurality of multimode optical waveguide fibers each having a 80 μm diameter.

A sandpaper test was used to compare microbend performance of the fibers of Examples 1 and 2 by depressing a 1.2 m length of each fiber between two flat steel plates covered by sandpaper (P1000 and P600). Separate tests and comparisons were performed for fibers having outer diameters of 125 $\mu$m and 80 $\mu$m, the results of which are illustrated in FIGS. 9 and 10, respectively.

The optical signal transmission link 10 manufactured in accordance with the present invention may be used in an optical fiber communication system 18, as illustrated in FIG. 1. System 18 includes an optical transmitter 20 adapted to transmit signal 14 through signal mode optical fiber 12 and multimode optical fiber 16. System 18 also includes an optical receiver 22 for receiving optical signal 14.

Figure 11:
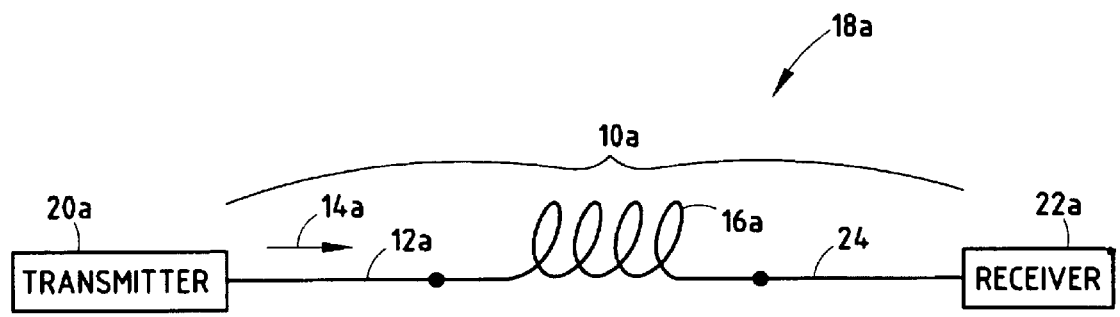
FIG. 11 is a schematic view of a fiber optic communication system employing an alternative embodiment of the transmission link of the present invention.

In an alternative embodiment transmission link 10a (FIG. 11) includes a single mode optical fiber 12a and a multimode optical fiber 16a similar to single mode optical fiber 12 and multimode optical fiber 16 described above. Since transmission link 10a and optical fiber communication system 18a are similar to previously described transmission link 10 and optical fiber communication system 18, similar parts appearing in FIG. 1 and FIG. 11 respectively are represented by the same, corresponding reference numeral, except for the suffix "a" in the numerals of the latter. The transmission link 10a further includes a single mode fiber that coupled multimode fiber 16a to receiver 22a, thereby ensuring single mode operation of system 18a. In most systems, both ends of transmission link 10a will be capable of two-way signal transmission, and transmitter 20a and receiver 22a are shown for illustration only.

The present invention utilizes a first single mode optical fiber in combination with a graded index multimode optical fiber to provide an optical signal transmission link that is highly resistant to microbend and macrobend attenuation losses, while simultaneously providing a large mode field diameter.

It will become apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

What is claimed is:

1. An optical signal transmission link, comprising:
   a first single mode optical fiber for receiving an optical signal; and
   a graded index multimode optical fiber for receiving the optical signal from the first single mode optical fiber, wherein the multimode fiber is adapted to support the propagation of greater than or equal to 4 LP modes within a wavelength range of from about 1310 nm to about 1550 nm, the multimode fiber has a mode field diameter of the fundamental mode of within the range of from about 3.0 $\mu$m to about 14.0 $\mu$m within a wavelength range of from about 1300 nm to about 1650 nm, and wherein the multimode fiber has a numerical aperture (NA) value of greater than or equal to about 0.16 and a refractive index profile of the multimode optical fiber is substantially unchanged along an entire length thereof and wherein the multimode fiber provides a bending loss of less than or equal to about 0.60 dB within a wavelength rant of from about 1300 nm to about 1630 nm when 1000 loops of the multimode fiber is wrapped about a cylinder having a 2.0 mm diameter.

2. The transmission link of claim 1, wherein the bending loss of the multimode fiber is less than or equal to about 0.50 dB within a wavelength range of from about 1300 nm to about 1630 nm when 1000 loops of the multimode fiber is wrapped about a cylinder having a 5.0 mm diameter.

3. The transmission link of claim 2, wherein the bending loss of the multimode fiber is less than or equal to about 0.50 dB within a wavelength range of from about 1300 nm to about 1630 nm when 1000 loops of the multimode fiber is wrapped about a cylinder having an 8.0 mm diameter.

4. The transmission link of claim 1, wherein the mode field diameter of the multimode fiber of the fundamental mode is about 7.0 $\mu$m at a wavelength of about 1310 nm.

5. The transmission link of claim 1, wherein the mode field diameter of the multimode fiber of the fundamental mode is about 9.3 $\mu$m at a wavelength of about 1310 nm.

6. The transmission link of claim 1, wherein the numerical aperture (NA) value of the multimode fiber is greater than or equal to about 0.20.

7. The transmission link of claim 1, wherein the graded index of the multimode fiber includes a parabolic index.

8. The transmission link of claim 7, the multimode fiber has a core diameter of within the range of from about 10 $\mu$m to about 70 $\mu$m.

9. The transmission link of claim 7, wherein the multimode fiber has a core diameter of within the range of from about 15 $\mu$m to about 50 $\mu$m.

10. The transmission link of claim 8, wherein the multimode fiber has a core diameter of within the range of from about 20 $\mu$m to about 40 $\mu$m.

11. The transmission link of claim 8, wherein the numerical aperture (NA) value of the multimode fiber is greater than or equal to about 0.275.

12. The transmission link of claim 1, wherein the multimode fiber has an alpha profile with an alpha value ($\alpha$) of within the range of from about 0.5 to about 5.0.

13. The transmission link of claim 12, wherein the alpha value ($\alpha$) of the multimode fiber is within the range of from about 1.0 to about 3.0.

14. The transmission link of claim 13, wherein the alpha value ($\alpha$) of the multimode fiber is within the range of from about 1.5 to about 2.5.

15. The transmission link of claim 1, wherein multimode fiber has a maximum refractive index difference ($\Delta$) of greater than or equal to about 0.8%.

16. The transmission link of claim 15, wherein the maximum refractive index difference ($\Delta$) of the multimode fiber is greater than or equal to about 1.0%.

17. The transmission link of claim 16, wherein the maximum refractive index difference ($\Delta$) of the multimode fiber is greater than or equal to about 3.0%.

18. The transmission link of claim 1, further including:
   a second single mode optical fiber for receiving the optical signal from the multimode optical fiber, wherein the second single mode fiber is adapted to ensure propagation of only a single mode to an optical receiver.

19. An optical fiber communication system, comprising:
   an optical transmitter adapted to transmit an optical signal;
   a first single mode optical fiber for receiving the optical signal from the transmitter;
   a graded index multimode optical fiber for receiving the optical signal from the first single mode optical fiber, wherein the multimode fiber is adapted to support the propagation of greater than or equal to 4 LP modes within a wavelength range of from about 1310 nm to about 1550 nm, the multimode fiber has a mode field diameter of the fundamental mode of within the range of from about 3.0 $\mu$m about 14.0 $\mu$m within a wavelength range of from about 1300 nm to about 1650 nm, and wherein the multimode fiber has a numerical aperture (NA) value of greater than or equal to about 0.16 and a refractive index profile of the multimode optical fiber is substantially unchanged along an entire length thereof and wherein the multimode fiber provides a bending loss of less than or equal to about 0.60 dB within a wavelength range of from about 1300 nm to about 1630 nm when 1000 loops of the multimode fiber is wrapped about a cylinder having a 2.0 mm diameter; and an optical receiver for receiving the optical signal from the multimode fiber.

20. The communication system of claim 19, further including:

a second single mode optical fiber for receiving the optical signal from the multimode optical fiber, wherein the second single mode fiber is adapted to ensure propagation of only a single mode to the optical receiver.

21. An optical signal transmission link, comprising:

a first single mode optical fiber for receiving an optical signal; and a graded index multimode optical fiber for receiving the optical signal from the first single mode optical fiber, wherein the multimode fiber supports the propagation of greater than or equal to 4 LP modes within a wavelength range of from about 1310 nm to about 1550 nm, and wherein the multimode fiber provides a bending loss of less than or equal to about 0.60 dB within a wavelength range of from about 1300 nm to abut 1650 nm when 1000 loops of the multimode fiber is wrapped about a cylinder having a 2.0 mm diameter and a refractive index profile of the multimode optical fiber is substantially unchanged along an entire length thereof.

22. The transmission link of claim 21, wherein the bending loss of the multimode fiber is less than or equal to about 0.50 dB within a wavelength range of from about 1300 nm to about 1630 nm when 1000 loops of the multimode fiber is wrapped about a cylinder having a 5.0 mm diameter.

23. The transmission link of claim 22, wherein the bending loss of the multimode fiber is less than or equal to about 0.50 dB within a wavelength range of from about 1300 nm to about 1630 nm when 1000 loops of the multimode fiber is wrapped about a cylinder having a 8.0 mm diameter.

24. The transmission link of claim 21, wherein the multimode fiber has a mode field diameter of the fundamental mode within the range of from about 3.0 $\mu$m about 14.0 $\mu$m within a wavelength range of from about 1300 nm to about 1650 nm.

25. The transmission link of claim 24, wherein the mode field diameter of the multimode fiber of the fundamental mode is about 7.0 $\mu$m at a wavelength of about 1310 nm.

26. The transmission link of claim 25, wherein the mode field diameter of the multimode fiber of the fundamental mode is about 9.3 $\mu$m at a wavelength of about 1310 nm.

27. The transmission link of claim 21, wherein multimode fiber has a numerical aperture (NA) value of greater than or equal to about 0.16.

28. The transmission link of claim 27, wherein the numerical aperture (NA) value of the multimode fiber is greater than or equal to about 0.20.

29. The transmission link of claim 21, wherein the graded index of the multimode fiber includes a parabolic index.

30. The transmission link of claim 29, wherein the multimode fiber has a core diameter of within the range of from about 10 $\mu$m to about 70 $\mu$m.

31. The transmission link of claim 30, wherein the multimode fiber has a core diameter of within the range of from about 15 $\mu$m to about 50 $\mu$m.

32. The transmission link of claim 31, wherein the multimode fiber has a core diameter of within the range of from about 15 $\mu$m to about 50 $\mu$m.

33. The transmission link of claim 30, wherein the multimode fiber has a numerical aperture (NA) value of greater than or equal to about 0.275.

34. The transmission link of claim 21, wherein the multimode fiber has an alpha profile with an alpha value ($\alpha$) of within the range of from about 0.5 to about 5.0.

35. The transmission link of claim 34, wherein the alpha value ($\alpha$) of the multimode fiber is within the range of from about 1.0 to about 3.0.

36. The transmission link of claim 35, wherein the alpha value ($\alpha$) of the multimode fiber is within the range of from about 1.5 to about 2.5.

37. The transmission link of claim 21, wherein multimode fiber has a maximum refractive index difference ($\Delta$) of greater than or equal to about 0.8%.

38. The transmission link of claim 37, wherein the maximum refractive index difference ($\Delta$) of the multimode fiber is greater than or equal to about 1.0%.

39. The transmission link of claim 38, wherein the maximum refractive index difference ($\Delta$) of the multimode fiber is greater than or equal to about 3.0%.

40. The transmission link of claim 21, further including:

a second single mode optical fiber for receiving the optical signal from the multimode optical fiber, wherein the second single mode fiber is ensures propagation of only a single mode to an optical receiver.

41. An optical fiber communication system, comprising:

an optical transmitter for transmitting an optical signal;

a first single mode optical fiber for receiving the optical signal from the transmitter;

a graded index multimode optical fiber for receiving the optical signal from the first single mode optical fiber, wherein the multimode fiber supports the propagation of greater than or equal to 4 LP modes within a wavelength range of from about 1310 nm to about 1550 nm, and wherein the multimode fiber provides a bending loss of less than or equal to about 0.60 dB within a wavelength range of from about 1300 nm to abut 1650 nm when 1000 loops of the multimode fiber is wrapped about a cylinder having a 2.0 mm diameter and a refractive index profile of the multimode optical fiber is substantially unchanged along an entire length thereof; and an optical receiver for receiving the optical signal from the multimode fiber.

42. The communication system of claim 41, further including:

a second single mode optical fiber for receiving the optical signal from the multimode optical fiber, wherein the second single mode fiber ensures propagation of only a single mode to the optical receiver.

* * * * *

UNITED STATES PATENT AND TRADEMARK OFFICE
CERTIFICATE OF CORRECTION

PATENT NO. : 6,711,330 B1
DATED : March 23, 2004
INVENTOR(S) : Denis Donlagic et al.

It is certified that error appears in the above-identified patent and that said Letters Patent is hereby corrected as shown below:

Column 9,
Line 57, "dB within a wavelength rant of from about" should read -- dB within a wavelength range of from about --

Signed and Sealed this

Twenty-sixth Day of April, 2005

JON W. DUDAS
*Director of the United States Patent and Trademark Office*